United States Patent
Guo et al.

(10) Patent No.: US 10,762,650 B1
(45) Date of Patent: Sep. 1, 2020

(54) SYSTEM AND METHOD FOR ESTIMATING DEPTH USING A MONOCULAR CAMERA

(71) Applicant: Toyota Motor Engineering & Manufacturing North America, Inc., Plano, TX (US)

(72) Inventors: Rui Guo, San Jose, CA (US); Wenjie Luo, Brookline, MA (US); Shalini Keshavamurthy, Sunnyvale, CA (US); Haritha Muralidharan, Santa Clara, CA (US); Fangying Zhai, St. Louis, MO (US); Kentaro Oguchi, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/570,048

(22) Filed: Sep. 13, 2019

(51) Int. Cl.
  *H04N 7/18* (2006.01)
  *G06T 7/50* (2017.01)
  (Continued)

(52) U.S. Cl.
  CPC .............. *G06T 7/50* (2017.01); *G06T 5/001* (2013.01); *G06T 7/13* (2017.01); *H04N 5/2253* (2013.01);
  (Continued)

(58) Field of Classification Search
  CPC .......... H04N 7/18; H04N 5/2253; G06T 7/50; G06T 7/13; G06T 5/001;
  (Continued)

(56) References Cited

U.S. PATENT DOCUMENTS

| 10,371,530 B2 * | 8/2019 | Ramanandan | ........... G01S 19/53 |
| 10,600,234 B2 * | 3/2020 | Herman | ................... B60R 1/00 |

(Continued)

OTHER PUBLICATIONS

Akhtar et al., "Real Time Single Image Dehazing and Soil Removal Using CNNs," CSCS 2018, 6 pages, Sep. 13-14, 2018, Munich, Germany.

(Continued)

*Primary Examiner* — Trang U Tran
(74) *Attorney, Agent, or Firm* — Christopher G. Darrow; Darrow Mustafa PC (57) ABSTRACT

A system for estimating depth using a monocular camera may include one or more processors, a monocular camera, and a memory device. The monocular camera and the memory device may be operably connected to the one or more processors. The memory device may include an image capture, an encoder-decoder module, a semantic information generating module, and a depth map generating module. The modules may configure the one or more processors to executed by one or more processors cause the one or more processors to obtain a captured image from the monocular camera, generate a synthesized image based on the captured image wherein the style transfer module was trained using a generative adversarial network, generate, a feature map based on the synthesized image, generate semantic information based on the feature map, and generate a depth map based on the feature map and the semantic information.

20 Claims, 6 Drawing Sheets

(51) Int. Cl.
*G06T 7/13* (2017.01)
*G06T 5/00* (2006.01)
*H04N 5/225* (2006.01)

(52) U.S. Cl.
CPC ..... *H04N 7/18* (2013.01); *G06T 2207/20004* (2013.01); *G06T 2207/20081* (2013.01); *G06T 2207/20084* (2013.01); *G06T 2207/30252* (2013.01)

(58) Field of Classification Search
CPC . G06T 2207/20004; G06T 2207/20081; G06T 2207/20084; G06T 2207/30252
USPC .......................... 348/135, 143, 148; 701/446
See application file for complete search history.

(56) References Cited

U.S. PATENT DOCUMENTS

| | | | | |
|---|---|---|---|---|
| 2019/0051056 | A1* | 2/2019 | Chiu | G06N 3/08 |
| 2019/0147296 | A1* | 5/2019 | Wang | G06K 9/6857 382/157 |
| 2019/0311259 | A1* | 10/2019 | Cricri | H04L 65/605 |
| 2019/0356905 | A1* | 11/2019 | Godard | G06T 7/73 |
| 2019/0387209 | A1* | 12/2019 | Yang | H04N 13/128 |
| 2020/0041276 | A1* | 2/2020 | Chakravarty | G06T 7/74 |
| 2020/0098135 | A1* | 3/2020 | Ganjineh | G06K 9/00798 |

OTHER PUBLICATIONS

Kumar et al., "Monocular Depth Prediction using Generative Adversarial Networks," 2018 IEEE/CVF Conference on Computer Vision and Pattern Recognition Workshops (CVPRW), pp. 413-421 (2018).

Atapour-Abarghouei & Breckon, "Real-Time Monocular Depth Estimation using Synthetic Data with Domain Adaptation via Image Style Transfer," Proceedings of the IEEE Conference on Computer Vision and Pattern Recognition, 11 pages (2018).

Haji-Esmaeili & Montazer, "Playing for Depth," pp. 1-15, arXiv:1810.06268v1 [cs.CV] Oct. 15, 2018.

Jiwani & Dandare, "Single Image Fog Removal Using Depth Estimation Based on Blur Estimation," International Journal of Scientific and Research Publications, vol. 3, Issue 6, pp. 1-6, ISSN 2250-3153 (2013).

Kratz & Nishino, "Factorizing Scene Albedo and Depth from a Single Foggy Image," Proc. of IEEE 12th International Conference on Computer Vision (ICCV), Kyoto, 8 pages (2009).

Li et al., "UnDeepVO: Monocular Visual Odometry through Unsupervised Deep Learning," 6 pages, arXiv:1709.06841v2 [cs.CV] Feb. 21, 2018.

Mancini et al., "Fast Robust Monocular Depth Estimation for Obstacle Detection with Fully Convolutional Networks," 9 pages, arXiv:1607.06349v1 [cs.RO] Jul. 21, 2016.

* cited by examiner

SYSTEM AND METHOD FOR ESTIMATING DEPTH USING A MONOCULAR CAMERA

TECHNICAL FIELD

The subject matter described herein relates, in general, to systems and methods for estimating depth using a monocular camera.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles are equipped with autonomous, semi-autonomous, and/or active safety systems that utilize one or more sensors to monitor the environment around the vehicle. One type of sensor utilized by the systems may be a camera system. Camera systems can capture one or more images of the surrounding environment. However, images captured by these camera systems are two-dimensional images and do not include depth information when captured. With regard to autonomous, semi-autonomous, and/or active safety systems, these systems may require depth information regarding the surrounding environment.

SUMMARY

This section generally summarizes the disclosure and is not a comprehensive explanation of its full scope or all its features.

In one embodiment, a system for estimating depth using a monocular camera includes one or more processors, a monocular camera, and a memory device. The monocular camera and the memory device are operably connected to the one or more processors. The memory device may include an image capture module, a style transfer module, an encoder-decoder module, a semantic information generating module, and a depth map generating module.

The image capture module may include instructions that when executed by the one or more processors cause the one or more processors to obtain a captured image from the monocular camera. The style transfer module may include instructions that when executed by the one or more processors cause the one or more processors to generate a synthesized image based on the captured image. The style transfer module may be trained using a generative adversarial network. The encoder-decoder module may include instructions that when executed by the one or more processors cause the one or more processors to generate a feature map based on the synthesized image, wherein the feature map includes at least one matrix having at least one numerical element.

As to the semantic information generating module, this module may include instructions that when executed by the one or more processors cause the one or more processors to generate semantic information based on the feature map. The semantic information may indicate a boundary for at least one structure in the captured image. The depth map generating module may include instructions that when executed by the one or more processors cause the one or more processors to generate a depth map based on the feature map and the semantic information. The depth map may include an estimated depth for at least a portion of pixels of the captured image.

In another embodiment, a method for estimating depth using a monocular camera may include the steps of obtaining a captured image from the monocular camera, generating, by a style transfer module, a synthesized image based on the captured image, generating, by an encoder-decoder module, a feature map based on the synthesized image, generating semantic information based on the feature map, and generating a depth map based on the feature map and the semantic information.

The style transfer module may be trained using a generative adversarial network. The feature map may include at least one matrix having at least one numerical element. The semantic information may indicate a boundary for at least one structure in the captured image. The depth map may include an estimated depth for at least a portion of the pixels of the captured image.

In another embodiment, a non-transitory computer-readable medium for estimating depth using a monocular camera may include instructions that when executed by one or more processors cause the one or more processors to obtain a captured image from the monocular camera, generate, by a style transfer module, a synthesized image based on the captured image, generate, by an encoder-decoder module, a feature map based on the synthesized image, generate semantic information based on the feature map, and generate a depth map based on the feature map and the semantic information.

Like before, the style transfer module may be trained using a generative adversarial network. The feature map may include at least one matrix having at least one numerical element. The semantic information may indicate a boundary for at least one structure in the captured image. The depth map may include an estimated depth for at least a portion of pixels of the captured image.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system for estimating depth using images captured from a monocular camera. After capturing an image from the monocular camera, the system first determines if the image is clear or unclear. The image may be unclear if it is captured at nighttime or during adverse weather conditions, such as foggy conditions. If the image is determined to be unclear, the image is converted to a clear image, referred to as a synthesized image, using a style transfer module that may have been trained by a generative adverse network ("GAN").

The captured image or the synthesized image is then fed into an encoder-decoder module that can generate a feature map from the inputted image. Thereafter, the feature map is then fed into a semantic information generating module that can generate semantic information. The semantic information may be in the form of a semantic map or contour map that may outline one or more objects from the captured image.

The semantic information as well as the feature map are then provided to a depth estimation module that can generate a depth map. The depth map may include an estimated depth for at least a portion of pixels of the captured image. Thereafter, the depth map may be provided to one or more vehicle systems, such as an autonomous, semi-autonomous, or active safety system of a vehicle to operate the vehicle accordingly.

Figure 1:
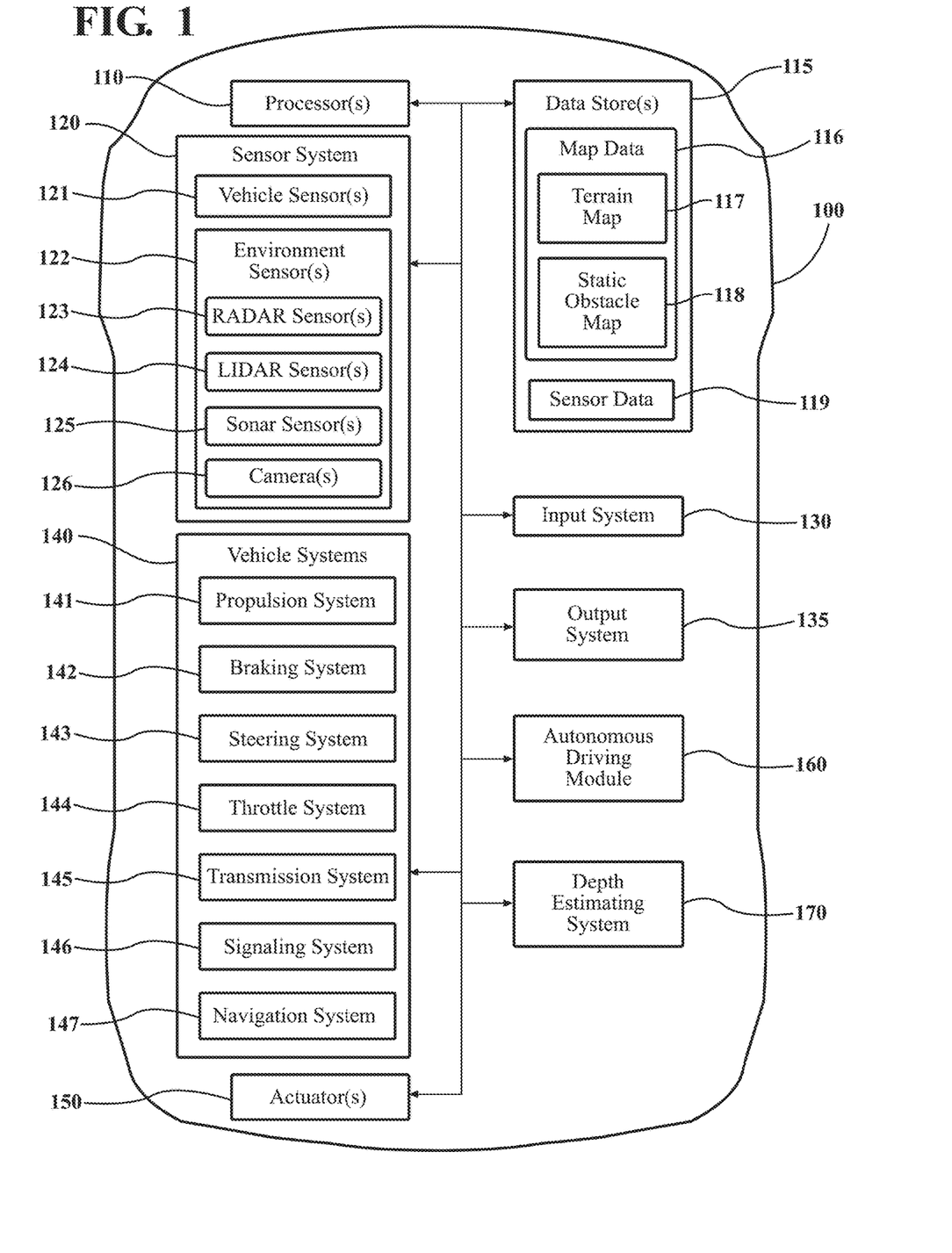
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation such as the levels defined by the Society of Automotive Engineers (SAE) (e.g., levels 0-5). As such, the autonomous system may provide semi-autonomous control or fully autonomous control as discussed in relation to the autonomous driving module 160.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

The sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and a monocular camera 126. In one or more arrangements, the monocular camera 126 can be a high dynamic range (HDR) camera or an infrared (IR) camera.

The vehicle 100 also includes a depth estimating system 170. The depth estimating system 170 may be incorporated within the autonomous driving module 160 or may be separate as shown. The depth estimating system 170 may be able to generate a depth map indicating the depth of at least a portion of pixels from an image captured by the monocular camera 126.

Figure 2:
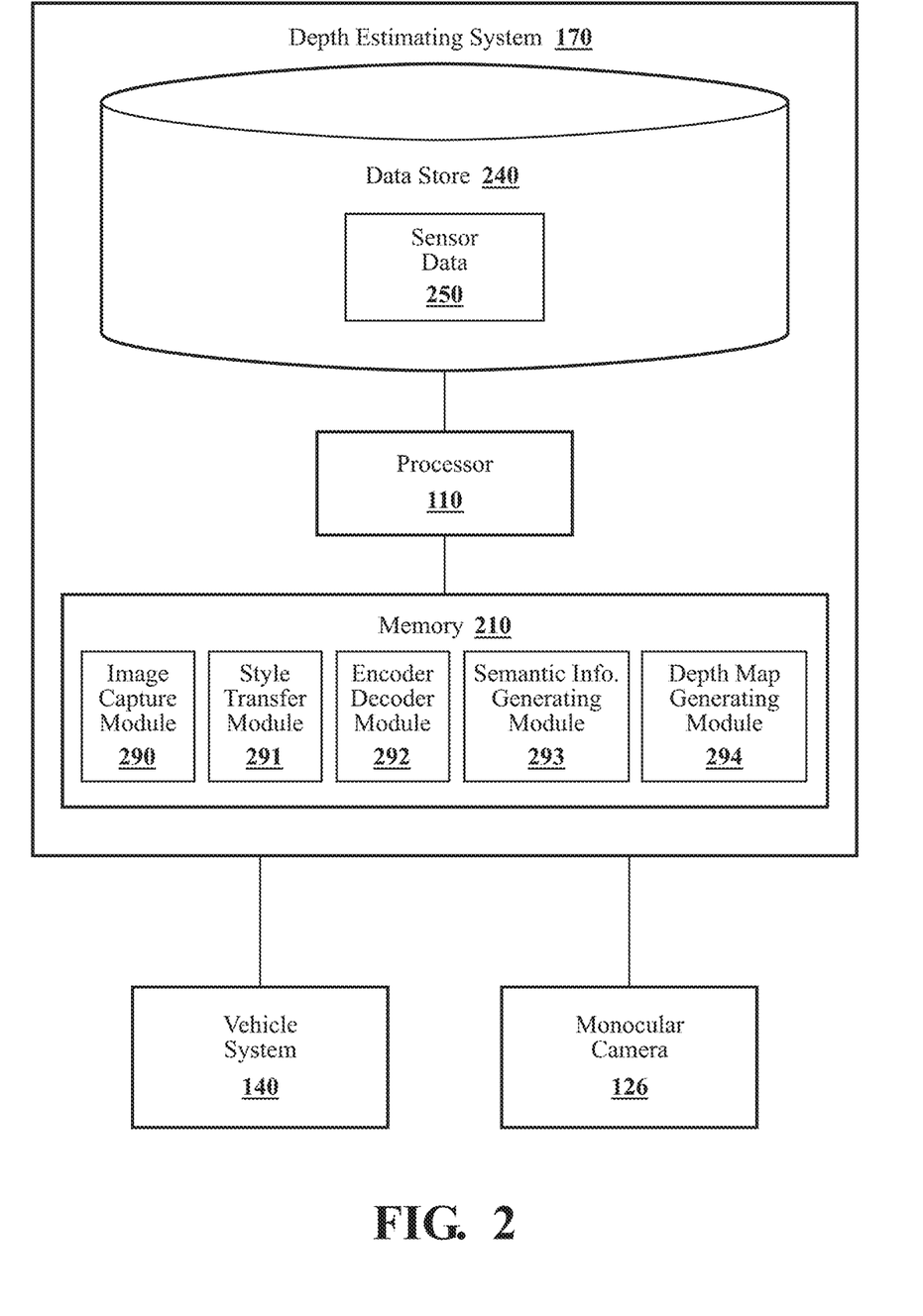
FIG. 2 illustrates one embodiment of a depth estimating system that is associated with estimating depth from images captured from a monocular camera.

With reference to FIG. 2, one embodiment of the depth estimating system 170 is further illustrated. As shown, the depth estimating system 170 includes a processor(s) 110. Accordingly, the processor(s) 110 may be a part of the depth estimating system 170 or the depth estimating system 170 may access the processor(s) 110 through a data bus or another communication path. In one or more embodiments, the processor(s) 110 is an application specific integrated circuit that is configured to implement functions associated with several modules, including an image capture module 290, a style transfer module 291, an encoder-decoder module 292, a semantic information generating module 293, and/or a depth map generating module 294. In general, the processor(s) 110 is an electronic processor such as a microprocessor that can perform various functions as described herein.

In one embodiment, the depth estimating system 170 includes a memory 210 that stores the image capture module 290, the style transfer module 291, the encoder-decoder module 292, the semantic information generating module 293, and/or the depth map generating module 294. The memory 210 is a random-access memory (RAM), read-only memory (ROM), a hard disk drive, a flash memory, or other suitable memory for storing the modules 291-294. The modules 291-294 are, for example, computer-readable instructions that when executed by the processor(s) 110 cause the processor(s) 110 to perform the various functions disclosed herein.

Furthermore, in one embodiment, the depth estimating system 170 includes a data store 240. The data store 240 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store 240 stores data used by the modules 291-294 in executing various functions. In one embodiment, the data store 240 includes sensor data 250, along with, for example, other information that is used by the modules 291-294. The sensor data 250 may include some or all of the sensor data 119 shown in FIG. 1 and described later in this disclosure.

Figure 3:
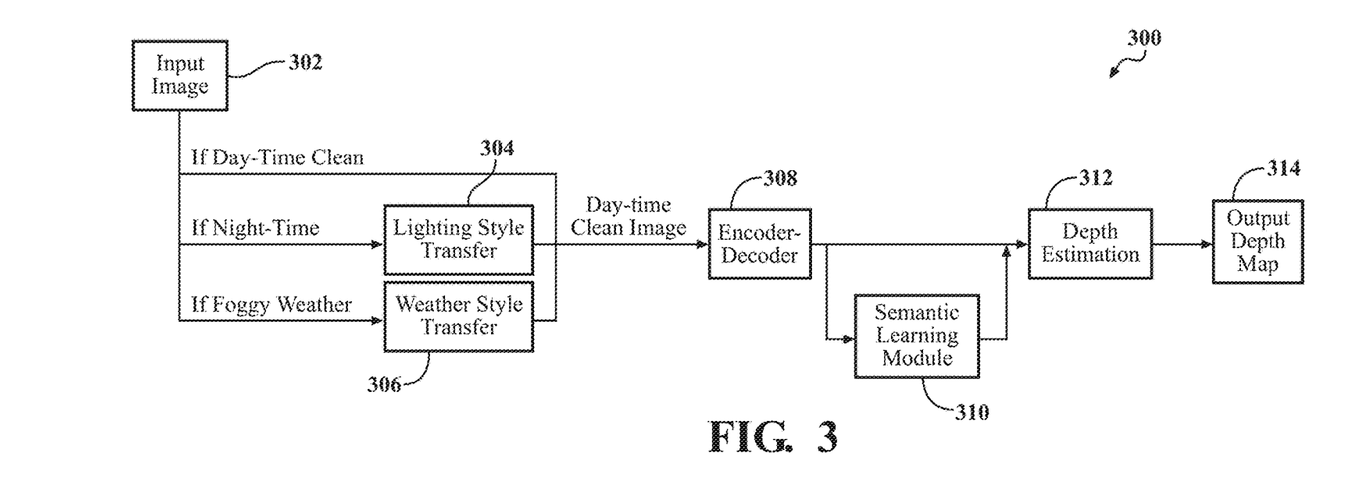
FIG. 3 illustrates a flow diagram for estimating depth from images captured from a monocular camera.

In order to provide a general overview regarding the depth estimating system 170, reference is made to FIG. 3, which illustrates a general flow 300 for estimating depth using the monocular camera 126. Essentially, the general flow 300 begins within input image, which is a captured image acquired from the monocular camera 126 and ends with a depth map 314. If the captured image 302 is determined to be a clean or clear image, the captured image is provided to the encoder-decoder 308. If it is determined that the captured image 302 is unclear image, the image 302 will undergo either a lighting style transfer 304 or a weather style transfer 306. Essentially, the lighting style transfer 304 converts a nighttime input image to a daytime image, using a GAN, as will be described later in this disclosure. Similarly, the weather style transfer 306 can generate a fog free or otherwise clean image from the captured image 302.

The encoder-decoder 308 converts the captured image into a feature map based on the inputted image. The feature map may include a matrix having at least one numerical element that shows and describes the inputted image. A semantic learning module 310 may be able to generate semantic information based on the feature map, which may be in the form a semantic map or a contour map. Thereafter, a depth estimating function 312 is performed, wherein a depth map 314 is generated based on the semantic information as well as the feature map.

Referring to FIG. 2, the image capture module 290 generally includes instructions that function to control the processor(s) 110 to instruct the monocular camera 126 to capture and transmit to the processor(s) 110 one or more images. The one or more images captured by the monocular camera may be images of the environment surrounding the vehicle 100.

The style transfer module 291 generally includes instructions that function to control the processor(s) 110 to generate a synthesized image based on the captured image. The style transfer module 291 may be trained using a GAN.

Figure 4:
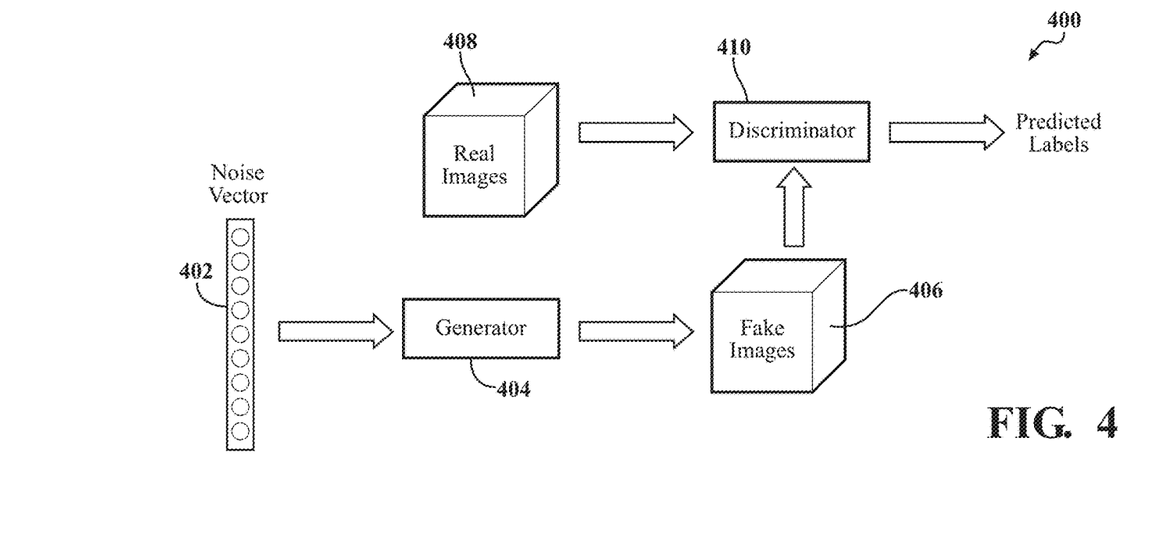
FIG. 4 illustrates a flow diagram for a generative adversarial network.

As best shown in FIG. 4, the basic structure of a GAN 400 includes a generator 404 and a discriminator 410. The GAN 400 is an approach to training a model for image synthesis that is comprised of two models: the generator 404 and the discriminator 410. The generator 404 takes a point from a latent space, such as noise vector 402 as input and generates synthesized images 406 from the domain, and the discriminator 410 takes an image as input and predicts whether it is real (from a dataset 408) or fake (synthesized images 406). Both models are trained in a game, such that the generator 404 is updated to better fool the discriminator 410 and the discriminator 410 is updated to better detect generated images.

In one example, the GAN used to train the style transfer module 291 may be based on a cycleGAN technique which involves the automatic training of image-to-image translation models without paired examples. The models are trained in an unsupervised manner using a collection of images from the source and target domain that may not be related.

Figure 5:
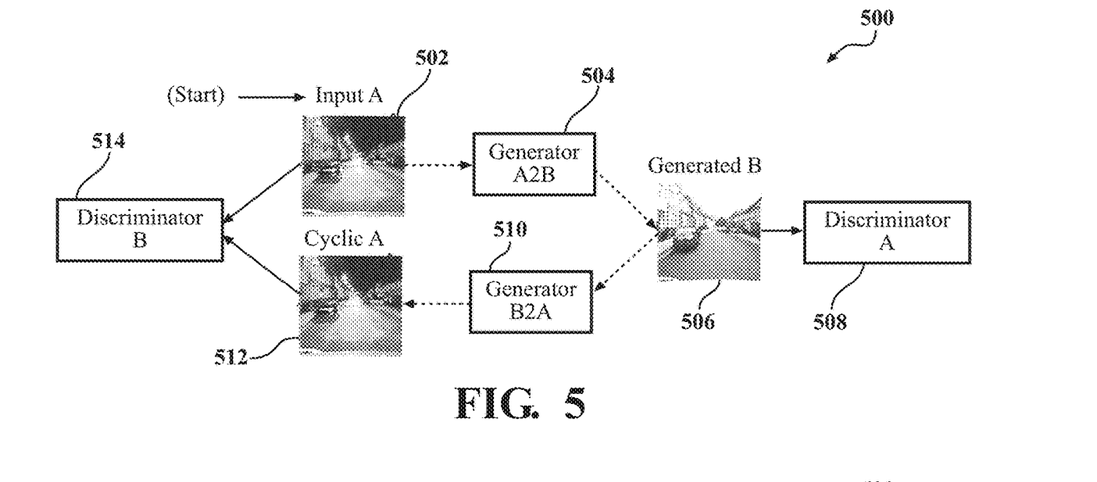
FIG. 5 illustrates an example of training a style transfer module using a generative adversarial network.

Referring to FIG. 5, a cycleGAN 500 is shown. The cycleGAN 500 includes generators 504 and 510 and discriminators 508 and 514. The generator 504 receives a captured image 502 and generates a clean image 506. The generator 510 receives the clean image 506 and then generates a nighttime image 512. The discriminators 508 and 514 are then used to determine how plausible the generated images and update the generator models utilized by the generators 504 and 510 accordingly.

The content and the distance semantics in the image captured by the monocular camera 126 may be preserved during the style transferring performed by the style transfer module 291. The color and the texture information may be changed from the original image domain to the target domain. The output of the style transfer module 291 is a new synthetic image that has the identical content but a different lighting style.

The encoder-decoder module 292 may include instructions that when executed by the processor(s) 110 cause the processor(s) 110 to generate a feature map based on the synthesized image (if the captured image was unclear) or the captured image (if the captured image was clear). The feature map may include at least one matrix having at least one numerical element.

The encoder-decoder module 292 may be a deep neural network typically in the diablo shape. The encoder-decoder module 292 may be used to transform the image from original pixel intensity space nonlinearly into another space, which potentially better represents the image intrinsic property. The encoder-decoder module 292 may contain multiple layer perception, convolutional/de-convolutional layer and some regularization, activation and normalization layers that are essentially components for an artificial neural network. The output is in the form of a feature map which may be a group of matrices with numerical elements.

Figure 6:
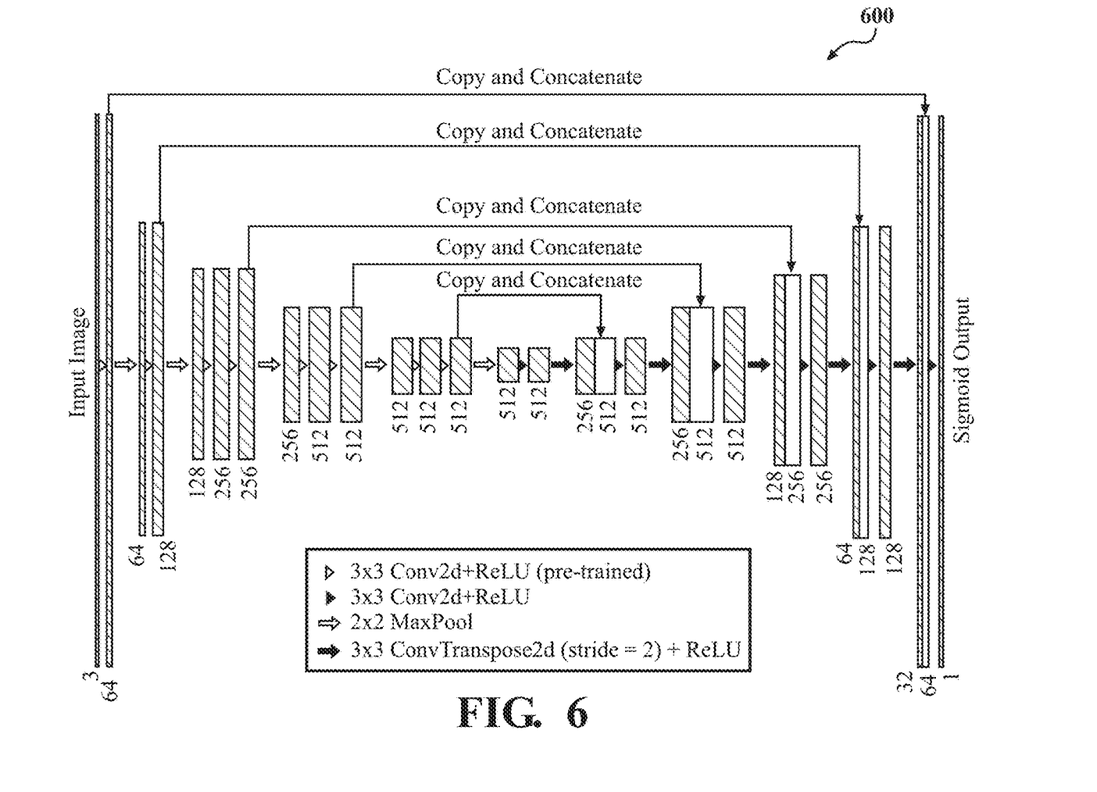
FIG. 6 illustrates a U-Net that may be utilized by an encoder-decoder module.

One example of a neural network utilized by the encoder-decoder module 292 is shown in FIG. 6 as a U-Net 600. A U-Net 600 may include a contracting path and an expansive path, which gives it the u-shaped architecture. The contracting path is a typical convolutional network that consists of repeated application of convolutions, each followed by a rectified linear unit and a max pooling operation. During the contraction, the spatial information is reduced while feature information is increased. The expansive pathway combines the feature and spatial information through a sequence of up-convolutions and concatenations with high-resolution features from the contracting path.

The semantic information generating module 293 may include instructions when executed by the processor(s) 110 cause the processor(s) 110 to generate semantic information based on the feature map. The semantic information may indicate a boundary for at least one structure in the captured image. The semantic information may be in the form of a semantic map or contour map.

Figure 7A:
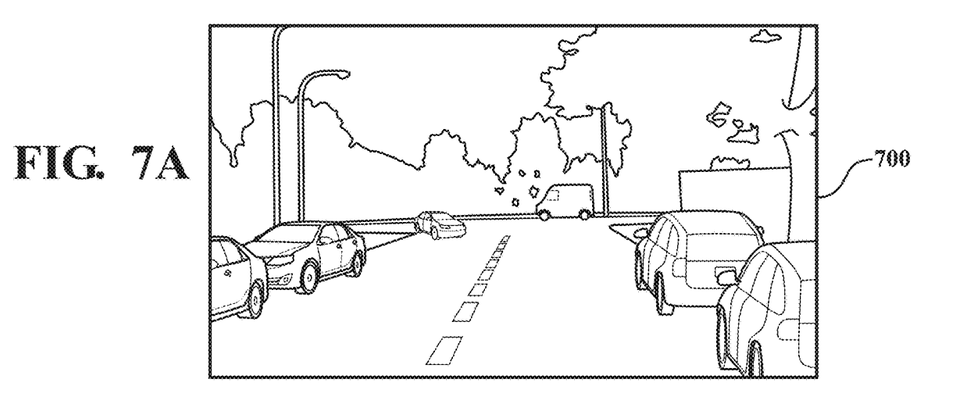
FIGS. 7A-7C illustrate a synthesized image, a semantic map, and a depth map, respectively.
Figure 7B:
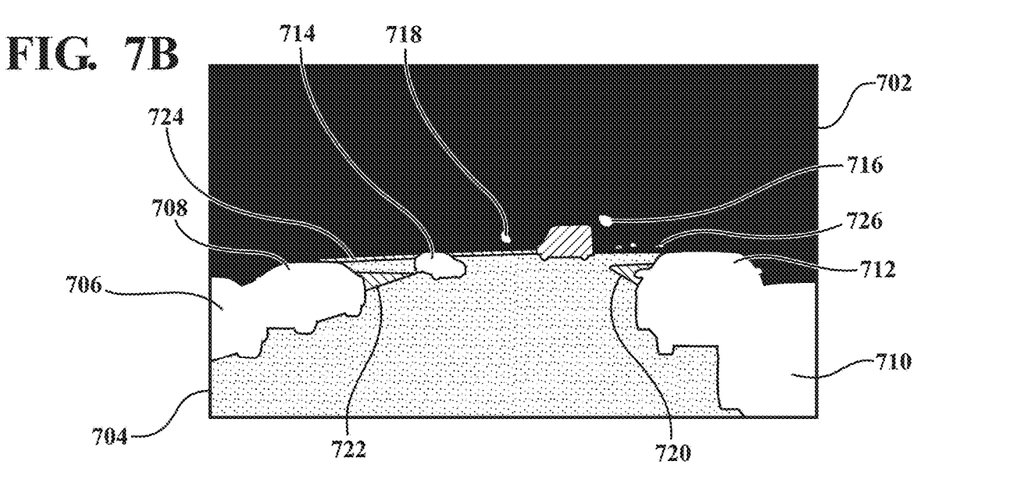

Scene semantics may provide information to better understand the completed scene structure, e.g. the scene layout and the boundary of the object. It is also beneficial information for the depth estimation as it provides the instance label and region supervision. For example, FIG. 7A illustrates an image captured by the monocular camera 126. FIG. 7B illustrates a semantic map 702 that indicates objects of different classes. Objects of different classes are given different colors. However, objects of the same class are given the same color.

In the example shown in FIG. 7B, the ground truth plane 704 is provided one type of color. Vehicles 706, 708, 710, 712, and 714 are all given the same color indicating that they are vehicles. The color given to the vehicles 706, 708, 710, 712, and 714 differs from the color provided to the ground truth plane 704. In like manner, traffic lights 716 and 718 have the same color but are given a different color from the ground truth plane 704 and the vehicles 706, 708, 710, 712, and 714. Similarly, the sidewalks 720, 722, 724 and 726 utilize the same color, but this color differs from the ground truth plane 704, the vehicles 706, 708, 710, 712, and 714 and the traffic lights 716 and 718.

The semantic information may assist the depth estimation task by concatenating the segmentation features leading to segmentation map back to the deep features that are used for the final depth map regression. The explicit semantic learning module may be utilized to regulate the detailed object depth at the boundary region with its high-level semantics. It is noted that, the input for the semantic information generating module 293 may be the same features calculated from the encoder-decoder module 292, and thus may not increase the computation burden. In the training stage of the semantic information generating module 293, a ground truth instance segmentation map may be utilized for supervision. Meanwhile, the training stage may also consider the adversarial loss as an extra refinement.

The depth map generating module 294 may include instructions that when executed by the processor(s) 110 cause the processor(s) 110 to generate a depth map based on the feature map and the semantic information. The depth map may include an estimated depth for at least a portion of pixels of the captured image and/or synthesized image.

The depth map generating module 294 may utilize a generative neural network to convert a deeply learned feature of the feature map with auxiliary semantic information into a depth map. In the training stage of the depth map generating module 294, a ground truth depth map may be utilized as the supervision. The depth map generating module 294 may also consider adversarial loss as an extra refinement.

Figure 7C:
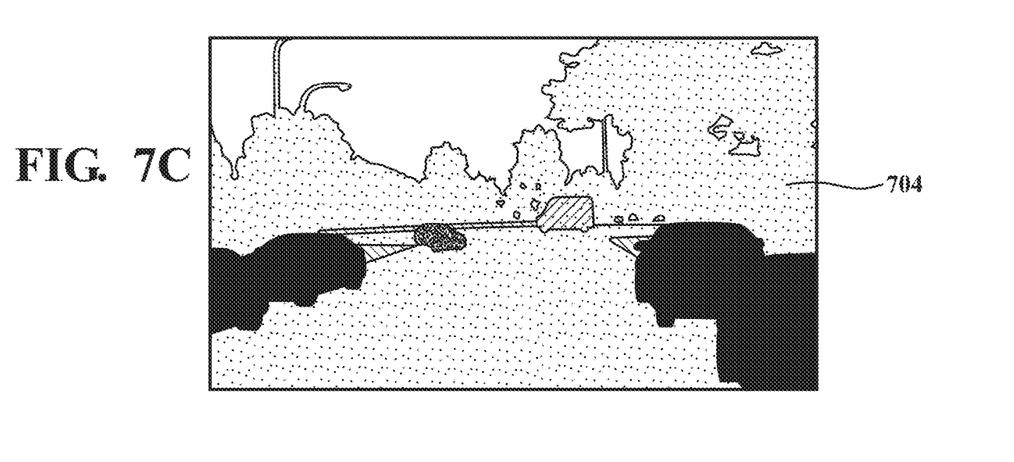

FIG. 7C illustrates an example of a depth map 705 generated by the depth map generating module 294. Here, the depth map 705 utilizes a grayscale convention, wherein the closest pixels are in black and become lighter as the pixels are indicated to be further away. The sky may be assumed to be an infinite distance away from the monocular camera 126 and will therefore be white. This depth map may be provided to anyone of several different vehicle systems, such as the autonomous driving module 160.

Figure 8:
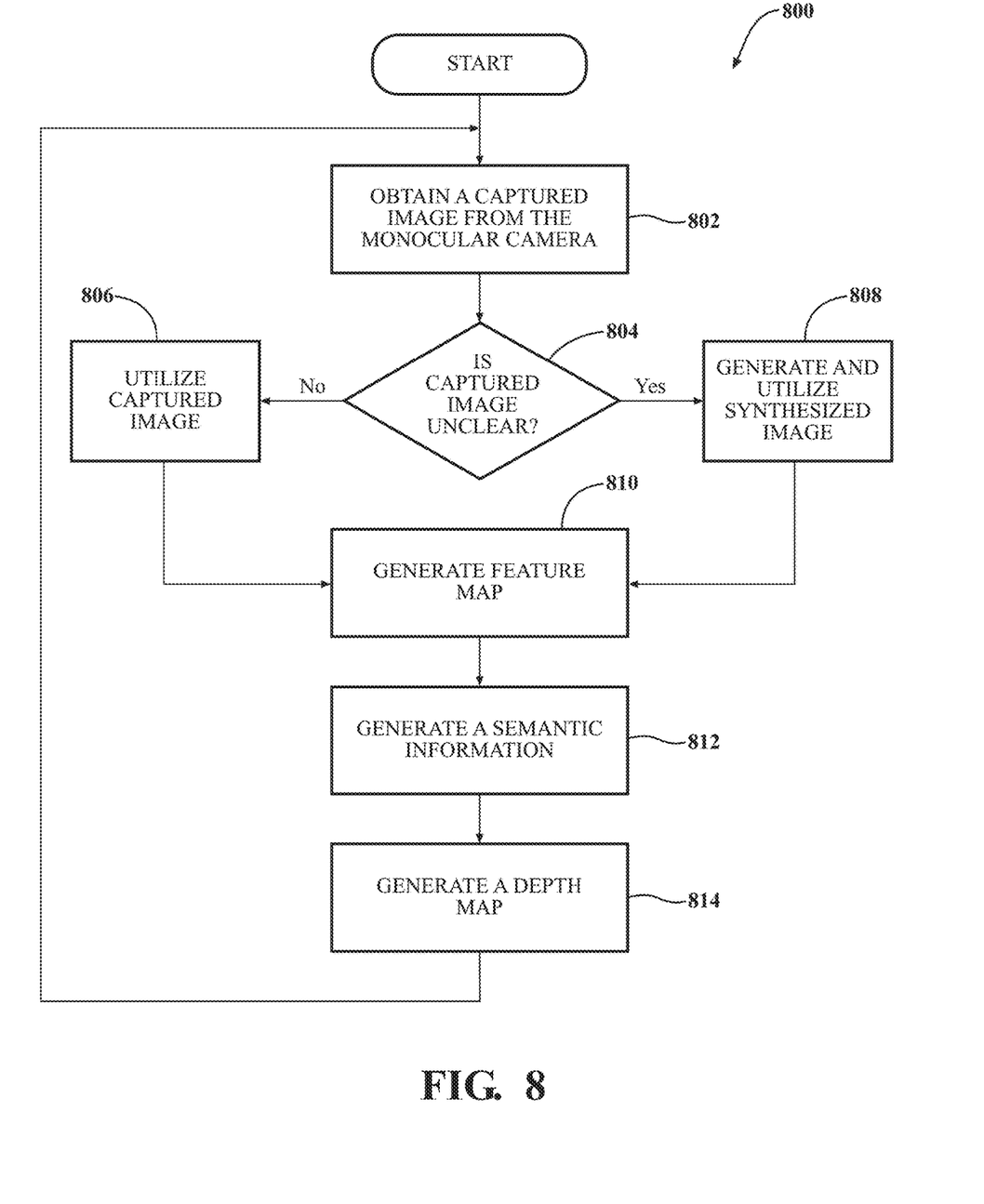
FIG. 8 illustrates a method for estimating depth using a monocular camera.

Referring to FIG. 8, a method 800 for controlling a vehicle having an autonomous mode and a semi-autonomous mode is shown. The method 800 will be described from the viewpoint of the vehicle 100 of FIG. 1 and the depth estimating system 170 of FIG. 2. However, this is just one example of implementing the method 800. While method 800 is discussed in combination with the depth estimating system 170, it should be appreciated that the method 800 is not limited to being implemented within the depth estimating system 170 but is instead one example of a system that may implement the method 800.

The method 800 begins at step 802, wherein the image capture module 290 causes the processor(s) 110 to obtain a captured image from the monocular camera 126. In step 804, the style transfer module 291 causes the processor(s) 110 to determine if the captured image is a clear or unclear image.

A clear image is generally considered to be an image that is during the daytime or with daytime like lighting and includes few, if any, imperfections caused by weather, such as fog, rain, snow, and the like. If it is determined by the processor(s) 110 that the captured image is an unclear image, the style transfer module 291 causes the processor(s) 110 to generate and utilize a synthesized image based on the captured image as indicated in step 808. The synthesized image may convert the captured image to a daytime image or may remove weather-related effects, such as fog, rain, snow, and the like. As described in the paragraphs above, a GAN may be utilized to train the style transfer module 291 in converting the captured image to the synthesized image.

However, if at step 804, the style transfer module 291 determines that the image is a clear image, the method 800 will proceed to step 806. No matter which image is utilized—the captured image as indicated in step 806 or the synthesized image as indicated in step 808, the method 800 proceeds to step 810, wherein the encoder-decoder module 292 is configured to generate a feature map. The feature map may include a matrix having at least one numerical element that shows and describes the inputted image.

Thereafter, the method 800 proceeds to step 812, wherein the semantic information generating module 293 causes the processor(s) 110 to generate semantic information using the feature map as an input. The semantic information may be in the form of a semantic map or contour map that may outline one or more objects from the captured image, such as the semantic map illustrated in FIG. 7B.

In step 814, the depth map generating module 294 causes the processor(s) 110 to generate a depth map using the feature map and the semantic information as inputs. The depth map may be a matrix indicating the depth of at least a portion of pixels from an image captured by the monocular camera 126. For example, as best shown in FIG. 7C, the depth map is a grayscale image wherein lighter pixels are objects that are further away from the monocular camera 126, while darker pixels are objects that are closer to the monocular camera 126. Of course, any one of a number of different methodologies may be utilized in generating and displaying the depth map.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120.

In some instances, at least a portion of the map data 116 and/or the sensor data 119 can be in one or more data stores 115 located onboard the vehicle 100. Alternatively, or in addition, at least a portion of the map data 116 and/or the sensor data 119 can be in one or more data stores 115 that are located remotely from the vehicle 100.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the depth estimating system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 can be operatively connected to communicate with the various vehicle systems 140 and/or individual components thereof. For example, returning to FIG. 1, the processor(s) 110, and/or the autonomous driving module(s) 160 can be in communication to send and/or receive information from the various vehicle systems 140 to control the movement, speed, maneuvering, heading, direction, etc. of the vehicle 100. The processor(s) 110, and/or the autonomous driving module(s) 160 may control some or all of these vehicle systems 140.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the transmission module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for estimating depth using a monocular camera, the system comprising:
   one or more processors;
   a monocular camera operably connected to the one or more processors;
   a memory device operably connected to the one or more processors, the memory device having an image capture module having instructions that when executed by the one or more processors cause the one or more processors to obtain a captured image from the monocular camera;
   the memory device further comprising a style transfer module, the style transfer module having instructions that when executed by the one or more processors cause the one or more processors to generate a synthesized image based on the captured image, wherein the style transfer module was trained using a generative adversarial network;
   the memory device further comprising an encoder-decoder module, the encoder-decoder module having instructions that when executed by the one or more processors cause the one or more processors to generate a feature map based on the synthesized image, wherein the feature map includes at least one matrix having at least one numerical element;
   the memory device further comprising a semantic information generating module, the semantic information generating module having instructions that when executed by the one or more processors cause the one or more processors to generate semantic information based on the feature map, the semantic information indicating a boundary for at least one structure in the captured image; and
   the memory device further comprising a depth map generating module, the depth map generating module having instructions that when executed by the one or more processors cause the one or more processors to generate a depth map based on the feature map and the semantic information, wherein the depth map includes an estimated depth for at least a portion of pixels of the captured image.

2. The system of claim 1, wherein the style transfer module further comprises instructions that when executed by the one or more processors cause the one or more processors to generate the synthesized image when the captured image is an unclear image.

3. The system of claim 1, wherein the encoder-decoder module further comprises instructions that when executed by the one or more processors cause the one or more processors to generate the feature map based on captured image when the captured image is a clear image.

4. The system of claim 1, wherein the captured image in an unclear image when the captured image is at least one of a nighttime image, a foggy image, and an attenuated image.

5. The system of claim 1, wherein the semantic information is at least one of a segmentation map and an object contour map.

6. The system of claim 1, wherein the depth map includes pixel level distance information from at least one of the captured image and the synthesized image.

7. The system of claim 1, wherein the monocular camera is mounted to a vehicle.

8. A method for estimating depth using a monocular camera comprising the steps of:
   obtaining a captured image from the monocular camera;
   generating, by a style transfer module, a synthesized image based on the captured image wherein the style transfer module was trained using a generative adversarial network;
   generating, by an encoder-decoder module, a feature map based on the synthesized image, wherein the feature map includes at least one matrix having at least one numerical element;
   generating semantic information based on the feature map, the semantic information indicating a boundary for at least one structure in the captured image; and
   generating a depth map based on the feature map and the semantic information, wherein the depth map includes an estimated depth for at least a portion of pixels of the captured image.

9. The method of claim 8, further comprising the step of generating, by the style transfer module, the synthesized image when the captured image is an unclear image.

10. The method of claim 8, further comprising the steps of generating the feature map based on captured image when the captured image is a clear image.

11. The method of claim 8, wherein the captured image in an unclear image when the captured image is at least one of a nighttime image, a foggy image, and an attenuated image.

12. The method of claim 8, wherein the semantic information is at least one of a segmentation map and an object contour map.

13. The method of claim 8, wherein the depth map includes pixel level distance information from at least one of the captured image and the synthesized image.

14. The method of claim 8, wherein the monocular camera is mounted to a vehicle.

15. A non-transitory computer-readable medium for estimating depth using a monocular camera, the non-transitory computer-readable medium comprising instructions that when executed by one or more processors cause the one or more processors to:
   obtain a captured image from the monocular camera;
   generate, by a style transfer module, a synthesized image based on the captured image wherein the style transfer module was trained using a generative adversarial network;
   generate, by an encoder-decoder module, a feature map based on the synthesized image, wherein the feature map includes at least one matrix having at least one numerical element;
   generate semantic information based on the feature map, the semantic information indicating a boundary for at least one structure in the captured image; and
   generate a depth map based on the feature map and the semantic information, wherein the depth map includes an estimated depth for at least a portion of pixels of the captured image.

16. The non-transitory computer-readable medium of claim 15, further comprising instructions that when executed by one or more processors cause the one or more processors to generate, by the style transfer module, the synthesized image when the captured image is an unclear image.

17. The non-transitory computer-readable medium of claim 15, further comprising instructions that when executed by one or more processors cause the one or more processors to generate the feature map based on captured image when the captured image is a clear image.

18. The non-transitory computer-readable medium of claim 15, wherein the captured image in an unclear image when the captured image is at least one of a nighttime image, a foggy image, and an attenuated image.

19. The non-transitory computer-readable medium of claim 15, wherein the semantic information is at least one of a segmentation map and an object contour map.

20. The non-transitory computer-readable medium of claim 15, wherein the depth map includes pixel level distance information from at least one of the captured image and the synthesized image.

* * * * *